No. 626,771.  
H. W. RAPPLEYE.  
METHOD OF PRESERVING FISH, &c.  
(Application filed Sept. 20, 1897.)
Patented June 13, 1899.
(No Model.)
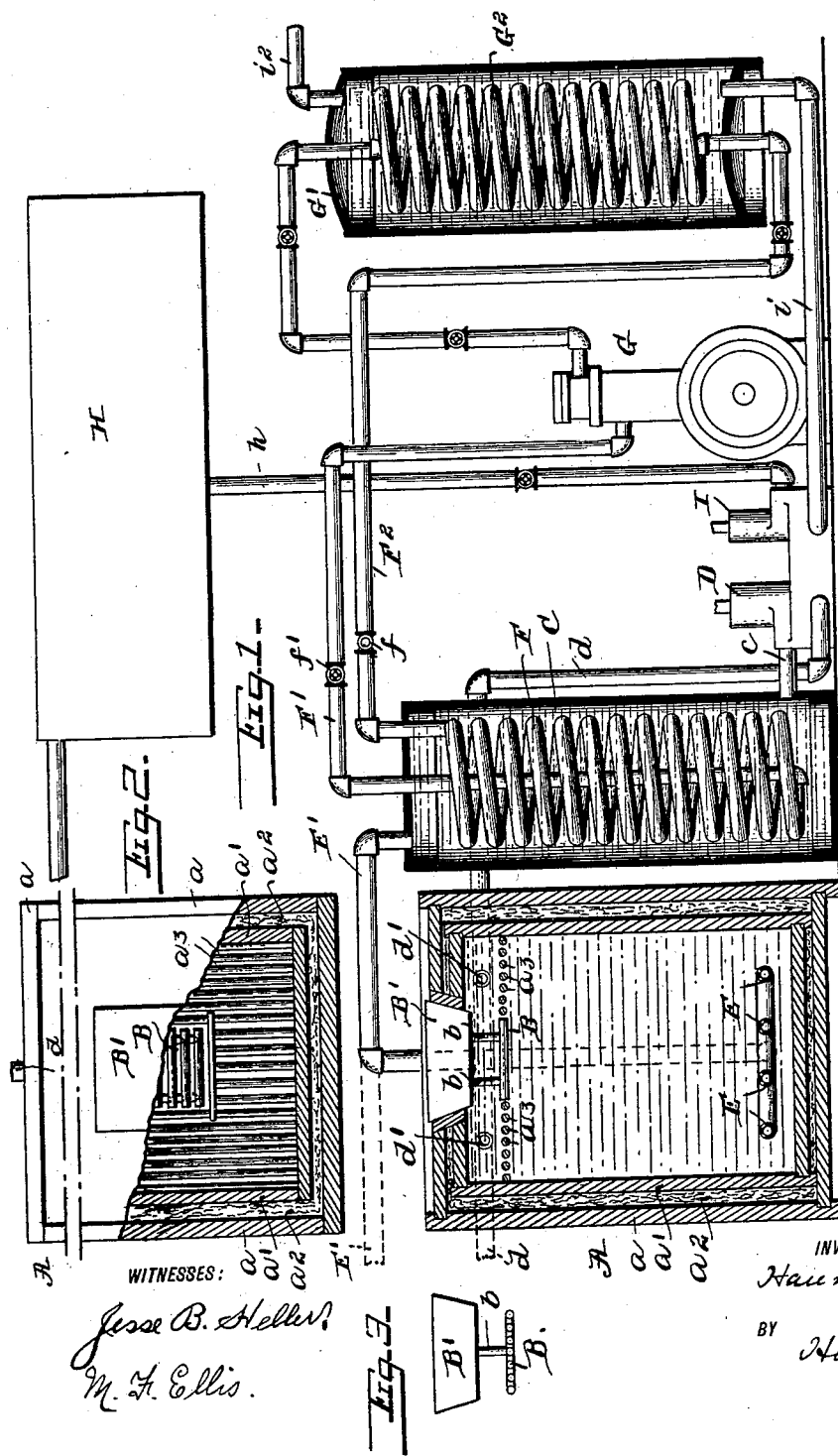
WITNESSES:  
Jesse B. Heller  
M. H. Ellis.
INVENTOR  
Hannibal W. Rappleye  
BY  
Harding & Harding  
ATTORNEYS

UNITED STATES PATENT OFFICE.

HANNIBAL W. RAPPLEYE, OF PHILADELPHIA, PENNSYLVANIA.

METHOD OF PRESERVING FISH, &c.

SPECIFICATION forming part of Letters Patent No. 626,771, dated June 13, 1899.

Application filed September 20, 1897. Serial No. 652,336. (No specimens.)

*To all whom it may concern:*

Be it known that I, HANNIBAL W. RAPPLEYE, a citizen of the United States, residing at Philadelphia, county of Philadelphia, and State of Pennsylvania, have invented a new and useful Improvement in Preservation, Storage, and Transportation of Meats, Poultry, Fish, Fruits, &c., without Putrefaction, of which the following is a full, clear, and exact description, reference being had to the accompanying drawings, which form a part of this specification.

My invention has for its object the preservation, storage, and transportation of meats, poultry, fish, fruits, &c., without putrefaction. In general prior to my invention or discovery such articles have been preserved in storage either by being placed in direct contact with ice or by having the air surrounding them chilled. In the latter case the chilling of the air was caused by ice or other forms of refrigeration. The use of ice directly is exceedingly expensive and in many places prohibitory, and, again, with its use the material is often spoiled by reason of imperfect refrigeration. With indirect chilling through the medium of chilled air the material must be placed in a practically airtight compartment. Otherwise disintegration would rapidly take place.

By my process, which will hereinafter be more fully described, I am enabled to carry on cold storage with less cost than with the use of ice either direct or indirect and with as little cost as any system of indirect refrigeration, and the material is better preserved than by any other system.

My method is especially applicable to the preservation and transportation of fish.

Fish of all kinds, except very large bone fish, cannot be preserved by indirect refrigeration on account of the heat in the bones causing a decomposition of the interior outward. So fish generally are transported and preserved by being brought directly into contact with the ice. This is both expensive and often deleterious to the flesh of the fish.

Speaking generally, my process or method of refrigerating and preserving consists in submerging the material to be preserved in liquid the temperature of which is maintained at a point below that of decomposition of the material. The temperature in all cases should be above the freezing-point of the liquid and so that at all times it is maintained as a liquid, but should also be at a temperature substantially at or below the freezing-point of the material to be preserved to effectually prevent, in contradistinction to retard, such decomposition. If the required temperature is above the freezing-point of water, I prefer to use water. If it is below, then I use salt brine, glycerin, or the like, dependent upon the material to be preserved, which congeal at lower temperatures. I have found by actual use of this method that fish may be preserved for a long period and when removed from the solution retain practically all their initial flavor and sweetness, there being no decomposition whatever, the brine or other liquid not affecting the flavor of the fish. I account for this latter condition in the following manner: The liquid being at the required low temperature when the fish are submerged therein, they become at once affected by cold and brought into such condition as not to be affected by the salt, glycerin, or other liquid.

Where meats are to be preserved, I prefer to use glycerin, as the glycerin will in no way affect the meat.

This method combines certainty, cheapness, and ease of transportation.

A secondary object of my invention is to maintain the temperature of the preserving liquid practically constant. To this end I have devised a system in which the liquid in the preserving-tank may be kept in continuous circulation for any desired time, the liquid in the tank being constantly drawn off and replenished, as hereinafter described, so that the tendency of the liquid to rise in temperature, due to absorption of heat from the material, as well as from the atmosphere surrounding the tank, is counteracted by the continual introduction of liquid which is reduced to the necessary low temperature and the continual withdrawal of the liquid in the tank. Thus the temperature is maintained at the requisite low temperature and ordinarily would be maintained practically constant. While I regard this method as the most practical and successful means of maintaining the temperature of the liquid below the freezing-point of the material to be preserved, I do not limit myself to this particular method of carrying out the primary object of the invention.

I will now describe the novel apparatus (illustrated in the accompanying drawings) in which this process or method may be carried out.

In the drawings, Figure 1 is a side elevation of the preserving-tank and refrigerating apparatus. Fig. 2 is a plan view of one of the tanks. Fig. 3 is a detail view of the tank-stopper.

A is the tank, having inner and outer walls $a$ and $a'$, respectively, preferably of wood, between which is placed non-heat-conductive material $a^2$. Near the upper surface of this tank is a lattice or screen $a^3$, extending over the entire area of the tank excepting the hatchway, the openings in this lattice or screen being less than the size of the article to be preserved. Centrally of this screen is the hatch B, also perforated, and which is connected to the wedge-shaped cover B' by the rods $b\ b$. The top walls of the tank have an orifice, and the cover B' fits in this orifice, there being a non-heat-conductive packing between it and the walls.

C is the refrigerator containing the refrigerating liquid. From this refrigerator a pipe $c$ leads to pump D. From pump D a pipe $d$ leads to orifices $d'$ in tank A above the lattice or screen. E are orifices near the bottom of the tank, connecting by pipe E' with refrigerator C. The pump D keeps the liquid in circulation from refrigerator C to tank A and return. The liquid is chilled in the refrigerator C, and, absorbing heat in tank A, is returned to and again chilled in refrigerator C.

F is a coil of pipe in refrigerator C. One end of this coil is connected to pipe F' and the other to pipe $F^2$, the pipe F' leading to compressor G and the pipe $F^2$ to condenser G'. The compressor G takes the ammonia which passes through the coil F and compresses it and forces it through the pipes $G^2$ in the condenser G', from which it passes by pipe $F^2$ to the refrigerator C. Upon the pipe $F^2$ is the regulating-valve $f$ and in the pipe F the valve $f'$.

H is a water-tank from which pipe $h$ leads to pump I. From this pump a pipe $i$ leads to the lower end of the condenser G', and from the top a pipe $i^2$ leads to waste.

In operation the cover B is lifted and the fish or material placed in the tank below the screen or lattice, so that they are submerged in the liquid. The cover is then replaced, and the lattice or screen maintains the material submerged in the liquid. The pump D keeps the brine in circulation, and the compressor G and condenser G' enable the ammonia to keep the brine or other liquid at a low temperature.

Having now fully described my invention, what I claim, and desire to protect by Letters Patent, is—

1. The method of preserving fish, flesh, fruits and the like which consists in submerging the material to be preserved in a liquid maintained at a temperature substantially that of, or below, the freezing-point of the material.

2. The method of preserving fish, flesh, fruits and the like, which consists in submerging the material to be preserved in a liquid maintained at a temperature substantially that of, or below, the freezing-point of the material, and maintaining said material submerged.

3. The method of preserving fish, flesh, fruits and the like, which consists in submerging the material to be preserved in a liquid maintained at a temperature substantially that of, or below, the freezing-point of the material, maintaining said material submerged, and maintaining a circulation of the liquid.

4. The method of preserving fish, flesh, fruits, and the like, which consists in reducing a quantity of liquid to a low temperature, and submerging the material to be preserved in a portion of said liquid, and simultaneously, first gradually withdrawing the liquid in which the material is submerged from said material, second, replenishing it by another portion of said quantity of liquid, and third, replenishing the latter by the liquid previously withdrawn from the material and reducing the temperature thereof as before, and maintaining said material submerged.

In testimony of which invention I have hereunto set my hand.

HANNIBAL W. RAPPLEYE.

Witnesses:
FRANK S. BUSSER,
CAROL. H. DESHONG.